(12) United States Patent
Sathaye et al.

(10) Patent No.: US 11,861,329 B2
(45) Date of Patent: Jan. 2, 2024

(54) METHOD AND APPARATUS FOR CODIFYING USER EXPERIENCE DESIGNS AND MANAGING THE CODIFIED USER EXPERIENCE DESIGNS

(71) Applicant: Dell Products, L.P., Hopkinton, MA (US)

(72) Inventors: Sumedh Sathaye, Austin, TX (US); Patrick East, Arvada, CO (US); Reut Kovetz, Tel Aviv (IL); Jennifer Minarik, Zionsville, IN (US); Kelly Lisai, Austin, TX (US)

(73) Assignee: Dell Products, L.P., Hopkinton, MA (US)

( * ) Notice: Subject to any disclaimer, the term of this patent is extended or adjusted under 35 U.S.C. 154(b) by 168 days.

(21) Appl. No.: 17/577,542

(22) Filed: Jan. 18, 2022

(65) Prior Publication Data

US 2023/0229398 A1 Jul. 20, 2023

(51) Int. Cl.
*G06F 8/20* (2018.01)
*G06F 9/451* (2018.01)
*G06F 8/71* (2018.01)
*G06F 9/448* (2018.01)
*G06F 8/10* (2018.01)

(52) U.S. Cl.
CPC ............... *G06F 8/10* (2013.01); *G06F 8/24* (2013.01); *G06F 8/71* (2013.01); *G06F 9/4498* (2018.02); *G06F 9/451* (2018.02)

(58) Field of Classification Search
CPC ...... G06F 8/10; G06F 8/24; G06F 8/71; G06F 9/4498; G06F 9/451
See application file for complete search history.

(56) References Cited

U.S. PATENT DOCUMENTS

| | | | | |
|---|---|---|---|---|
| 7,200,838 | B2* | 4/2007 | Kodosky | G06F 8/10 717/109 |
| 7,210,117 | B2* | 4/2007 | Kudukoli | H04L 9/40 717/109 |
| 7,962,426 | B2* | 6/2011 | Pall | G06F 21/6218 706/11 |
| 8,856,667 | B2* | 10/2014 | Gaudette | G06F 8/34 715/764 |
| 9,858,050 | B2* | 1/2018 | Emmons | G06F 8/38 |
| 10,474,506 | B1* | 11/2019 | Gray | G06F 9/4498 |
| 11,237,705 | B2* | 2/2022 | Sulcer | G06F 3/0484 |

(Continued)

*Primary Examiner* — Douglas M Slachta
(74) *Attorney, Agent, or Firm* — Anderson Gorecki LLP

(57) ABSTRACT

Designers create user experience designs using external design systems. An Experience Design Codification and Management System (EDCMS) retrieves a user experience definition based on the user experience design from the external design system, and generates a comprehensive user experience specification from the user experience definition. Part of the comprehensive user experience specification includes JSON, XML, or YAML code created based on the user experience definition. The EDCMS then packages and encodes the comprehensive user experience specification to create a codified user experience from the comprehensive user experience specification. The codified user experience is then versioned and digitally signed, and the versioned and signed codified user experience is stored in a user experience design repository.

20 Claims, 15 Drawing Sheets

(56) References Cited

U.S. PATENT DOCUMENTS

| | | | |
|---|---|---|---|
| 11,625,682 B2* | 4/2023 | Changizi | G06Q 10/10 |
| | | | 707/754 |
| 2003/0202014 A1* | 10/2003 | Wood | G06F 8/38 |
| | | | 715/763 |
| 2011/0270855 A1* | 11/2011 | Antonysamy | G06F 16/1794 |
| | | | 707/756 |
| 2019/0302975 A1* | 10/2019 | Rydzewski | G06F 16/9535 |
| 2022/0058065 A1* | 2/2022 | Kiefer | G06F 9/541 |
| 2022/0327006 A1* | 10/2022 | Makhija | G06N 20/00 |

* cited by examiner

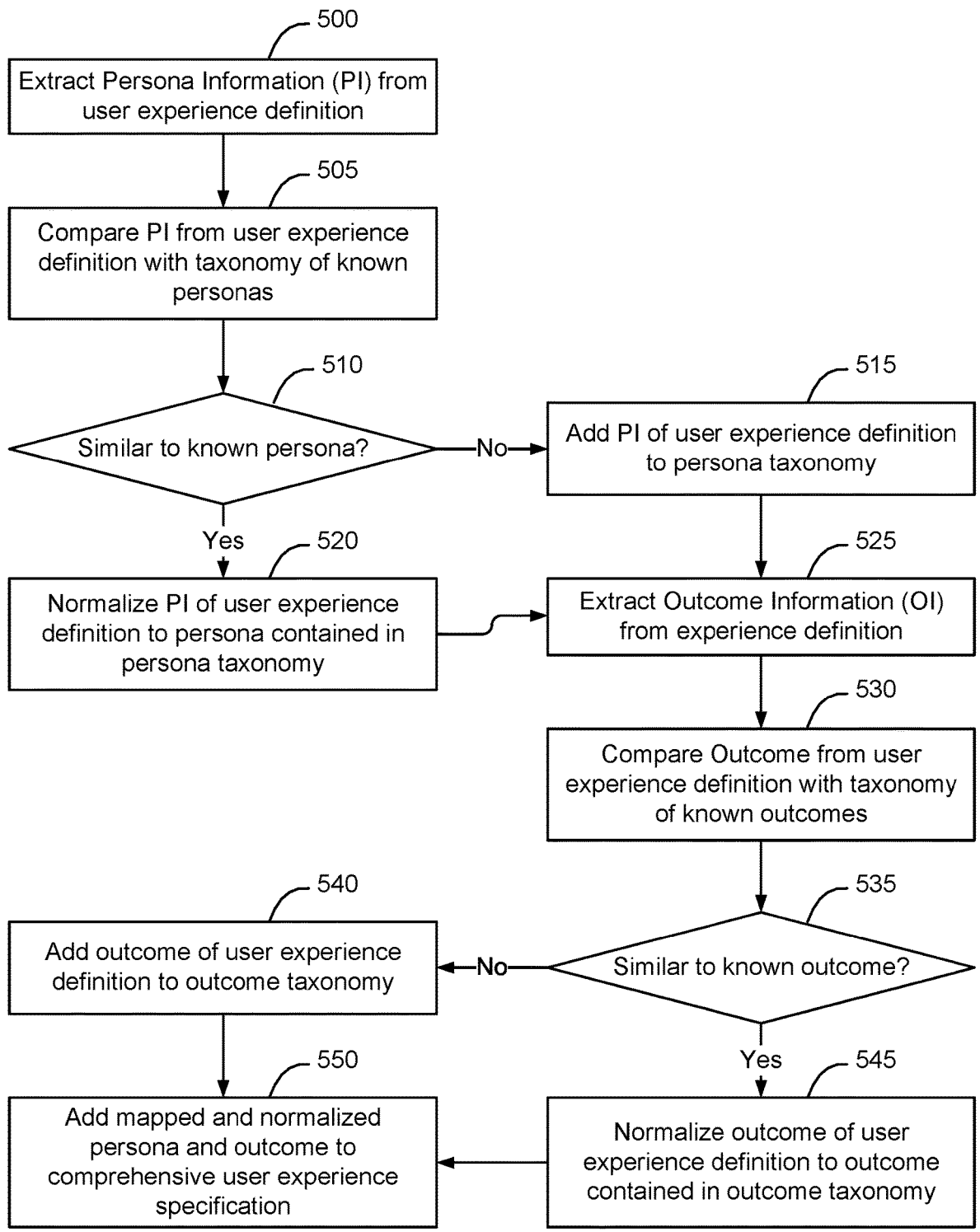

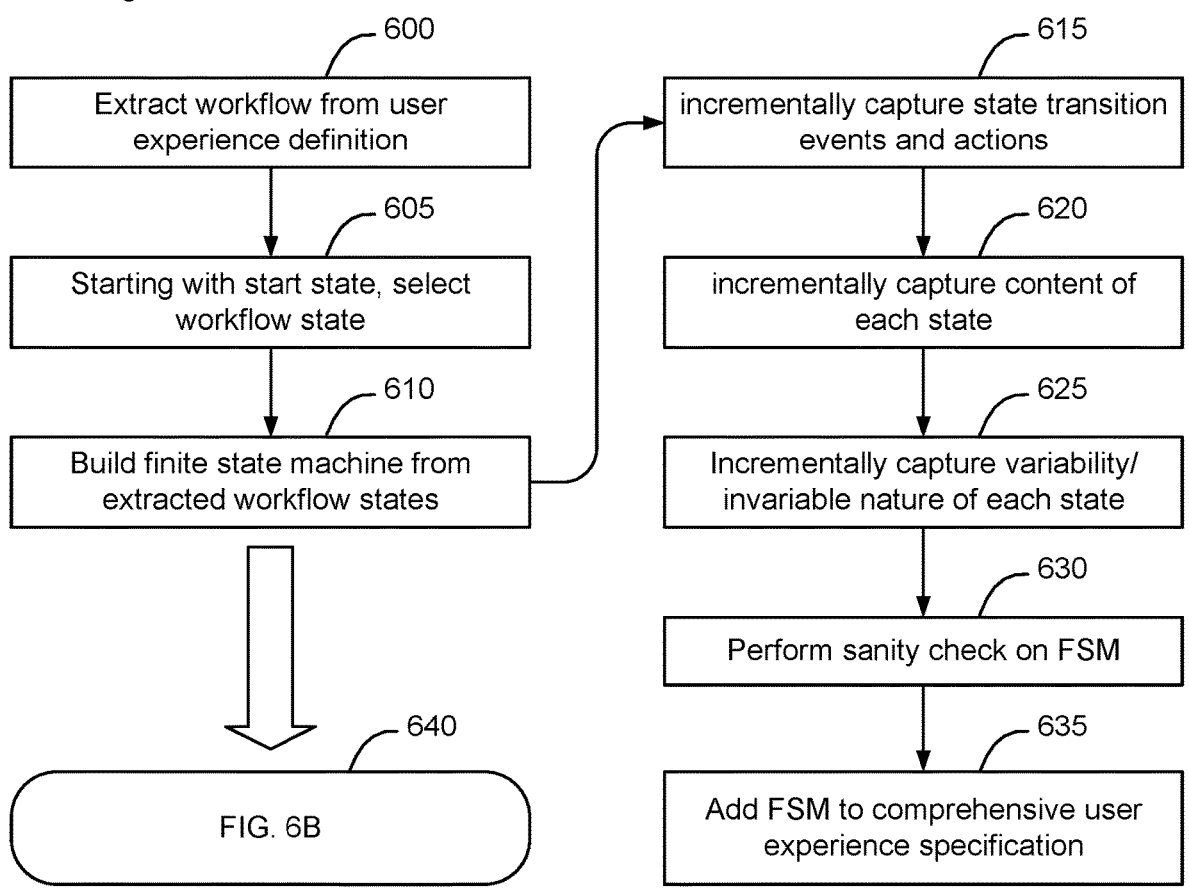

Consistency checking

Component Capture  FIG. 8

Specification Capture

Signature marking and versioning

METHOD AND APPARATUS FOR CODIFYING USER EXPERIENCE DESIGNS AND MANAGING THE CODIFIED USER EXPERIENCE DESIGNS

FIELD

This disclosure relates to computing systems and related devices and methods, and, more particularly, to a method and apparatus for codifying user experience designs and managing the codified user experience designs.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method and apparatus for codifying user experience designs and managing the codified user experience designs is provided. In some embodiments, designers create user experience designs using external design systems. An Experience Design Codification and Management System (EDCMS) retrieves a user experience definition based on the user experience design from the external design system, and generates a comprehensive user experience specification from the user experience definition. Part of the comprehensive user experience specification includes JSON, XML, or YAML code created based on the user experience definition. The EDCMS then packages and encodes the comprehensive user experience specification to create a codified user experience from the comprehensive user experience specification. The codified user experience is then versioned and digitally signed, and the versioned and signed codified user experience is stored in a user experience design repository.

BRIEF DESCRIPTION OF THE DRAWINGS

FIG. 5 is a flow chart of an example persona and outcome mapping and normalization process implemented by the example EDCMS of FIG. 1, according to some embodiments.

FIGS. 6A and 6B are a flow chart of an example finite state machine generation process implemented by the example EDCMS of FIG. 1, according to some embodiments.

DETAILED DESCRIPTION

Figure 1:
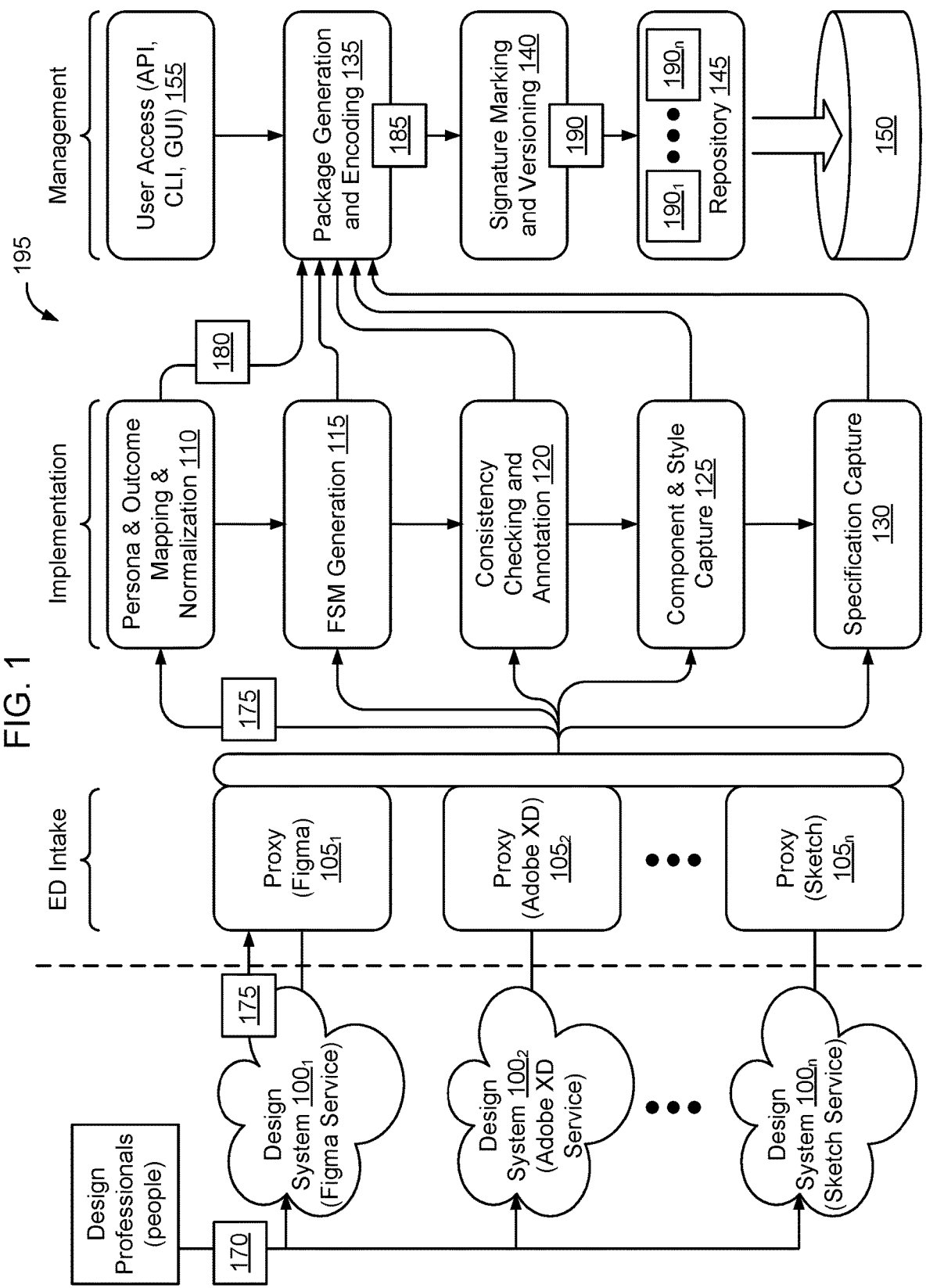
FIG. 1 is a functional block diagram of an example Experience Design Codification and Management System (EDCMS) interfaced with external user experience design systems, according to some embodiments.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Storage systems are used to provide storage services for host applications. When a host application wants to have data stored on a given storage system, the necessary storage volumes are created on the storage system by interacting with a user interface to the storage system. Humans can interact with the storage system, and likewise other automated processes can interact with the storage system.

Any interaction, whether it be between a human actor and a machine such as a storage system, or between two computer implemented systems, constitutes a "user experience" with a product. User experience design is the process of supporting user behavior through usability, usefulness, and desirability provided in the interaction with a product. Although an example system for codifying user experience designs and managing the codified user experience designs will occasionally be described in the context of codifying and managing user experience designs that are configured to enable users and storage systems to interact, it should be understood that embodiments may be used in many contexts, and are not limited to use in the context of codifying and managing user experience designs in the context of a storage system.

An example of a user experience design might be, for example, a Graphical User Interface (GUI) component or set of screens that is configured to enable a user to access a particular feature on a storage system. User experiences are designed, for example using design systems 100, to enable the graphical user interface to be used to achieve a particular objective. In the context of a GUI that is used to interface a software program, the term "user experience design", as used herein, is used to refer to a set of graphic components and transitions between states that enable a user to navigate, through the GUI, to enable the user to access the intended feature of the software program. In the context of a CLI, the term "user experience design" is used to refer to a selected set of API calls that are arranged to enable the user to access the intended objective.

Conventionally, user experience designs would be created by experience designers. For example, if a new feature is to be added to a software product, and the software product has a graphical user interface (GUI), often the GUI will need to be modified to enable the users to access the new feature of the software product. Stated differently, a new user experience will need to be created (designed) to enable the user to access the new feature of the software product. To create the new user experience, a software interaction design professional would create a version of how the GUI may be configured, to enable a person to access the new feature through the software product's GUI. The initial version of the changes to the GUI might be created by the design professional using a design tool such as Figma, Adobe XD, Sketch, or by manually diagramming the GUI experience.

The user experience design would then be reviewed by the design professionals, the product managers responsible for implementing the new feature in the software product, and engineers responsible for actually implementing the GUI from the mockup provided by the design professional. After agreeing on the details of the user experience design, the engineers would implement the user experience design in software to add the user experience design to the software product GUI. The GUI would then be tested to ensure that the new feature of the product is actually accessible via the GUI. Often this process would iterate multiple times from any stage back to the original design phase, which can cause delays in implementing new features in the software product. Additionally, where the new feature is intended to be accessed using multiple different user experience designs, such as by a CLI as well as a GUI, each of the user experience design would need to go through this process.

Moreover, the conventional process of creating user experience designs is a manual process that requires each participant to keep track of the latest version of the user experience design. In an environment where the user experience design is changing frequently, for example due to architecture changes, implementation approach changes, or due to market/customer requirement changes, this may be difficult to implement. For example, the design professionals and product development team may revise a user experience design, but the engineers tasked with implementing the user experience design may be working on an earlier version of the user experience design.

According to some embodiments, a method and apparatus for codifying user experience designs and managing the codified user experience designs is provided. An example user Experience Design Codification and Management System (EDCMS) is shown in FIG. 1. In some embodiments, designers create user experience designs 170 using external design systems 100. The EDCMS 195 retrieves a user experience definition 175 based on the user experience design from the external design system 100, and generates a comprehensive user experience specification 180 from the user experience definition 175. Part of the comprehensive user experience specification 180 includes JavaScript Object Notation (JSON), eXtensible Markup Language (XML) or YAML code created based on the user experience definition 175. The EDCMS 195 then packages and encodes the comprehensive user experience specification to create a codified user experience design 185 from the comprehensive user experience specification 180. The codified user experience design 185 is then versioned and digitally signed, and the versioned and signed codified user experience 190 is stored in a user experience design repository 145.

By automatically generating a codified user experience design 185 from a user experience design 170, it is possible to provide the engineers with a codified version of the intended user experience design 170, which describes in JSON, XML, YAML, or another code format the user experience design 170 that is to be implemented. This eliminates communication errors that might occur between the design professionals and engineers, because the engineers are automatically provided with a packaged and encoded codified user experience design 185, that is generated from the user experience design 170. By signing and versioning the codified user experience specification 190, and automatically entering the signed and versioned codified user experience 190 in a user experience design repository 145 where it can then be checked out/checked in, as necessary, it is possible to ensure that everyone is working to implement the correct version of user experience design 170. This facilitates collaboration by preventing different members of the design team from working toward implementation of different versions of the user experience design 170.

FIG. 1 is a functional block diagram of an example Experience Design Codification and Management System (EDCMS) 195, according to some embodiments. As shown in FIG. 1, in some embodiments design professionals (people) use existing experience design tools 100 to create user experience designs 170. Example existing design tools include design systems 1001-100*n*, which might be for example an online design system tool such as Figma 1001, Adobe XD 1002, or a Sketch 100*n*. Many external design systems 100 might be used, depending on the implementation. Additionally, in some embodiments, user experience designs may be created manually, i.e. without the help of tools such as Figma or Adobe XD, and then processed by a proxy 105 configured to perform image processing of the manually created design. It should be noted that the design systems 1001-100*n*, are outside of the EDCMS 195, as indicated by the vertical dashed line separating the external design systems 100 from the components of the EDCMS 195.

In some embodiments, the EDCMS 195 includes an experience design intake section configured to interact with the design systems 1001-100*n*, to retrieve user definitions 175 based on the user experience designs 170 that have been created by the design professionals using these external systems 100. For example, in some embodiments the EDCMS 195 includes a proxy 1051-105*n* configured to interact with each respective design system 1001-100*n*. As an example, if the Figma Service (design system 1001) enables external access at a particular URL, the Figma proxy 1051 may be configured to access the external Figma Service URL, request a design created by a particular design professional or team of design professionals, and then download the requested user experience definition 175. In some embodiments, each proxy operates in a stateless manner, and makes use of publicly available API interfaces for the experience design platforms 100. Although FIG. 1 shows a one-to-one correspondence between proxy 105 and design system 100, it should be understood that in some embodiments a given proxy 105 may be configured to interact with more than one design system 100, or that a single proxy 105 may be used to interact with all of the design systems 100.

According to some embodiments, the EDCMS 195 is configured to require the design professional to include experience metadata 350 (see FIG. 3) describing the intended environment of the software interaction experience.

The experience metadata 350, in some embodiments, includes information about who (the persona 305) the software interaction experience is being designed for. Different types of software users (different personas) might be provided with different software interaction experiences. For example, a system administrator may be given a different set of experiences than a normal user. Other personas might be a data center manager, network manager, software engineer, or other similar title. Personas may also be specified by capturing what the roles do, such as server administrator, storage administrator, backup administrator, filesystem user, auditor, security administrator, etc. In addition to specifying the persona 305, in some embodiments the experience metadata 350 also includes information about when, in the product lifecycle 310, the person specified in the persona metadata 305 is expected to encounter the software interaction experience.

In some embodiments, the experience metadata 350 includes information about the intended outcome of the user experience design 170. An "outcome", as that term is used herein, is used to refer to the objective of the software interaction experience. For example, if the software interaction experience has been created to enable a user to create a storage volume on a storage system, that would be the "outcome" that the design professional would specify in the outcome 315 aspect of the experience metadata 350. Other outcomes might include initial configuration of a system, setting up sub-tenants on a leased storage system, creating and mapping Logical Unit Numbers (LUNS) to hosts, monitoring system behavior, creating custom dashboards, etc. Many possible outcomes exist, although it would also be expected that there would be many similar outcomes that design professionals would create for different software products.

In some embodiments, the experience metadata 350 includes information about the particular mode of consumption 320, i.e. how a user is to be presented with the software interaction experience. Example modes 320 might include a Graphical User Interface (GUI) such as on a browser or on a mobile application, an Application Program Interface (API), a Command Line Interface (CLI), or a Continuous Integration/Continuous Delivery (CI/CD) system, or another form or mode of consumption of a user experience.

In some embodiments, the experience metadata 350 includes information about how the experience is achieved. This is the workflow 325 that is used to achieve the intended outcome. For a GUI based user experience design 170, the workflow specifies the human interaction actions with screen states and transitions between states.

Figure 3:
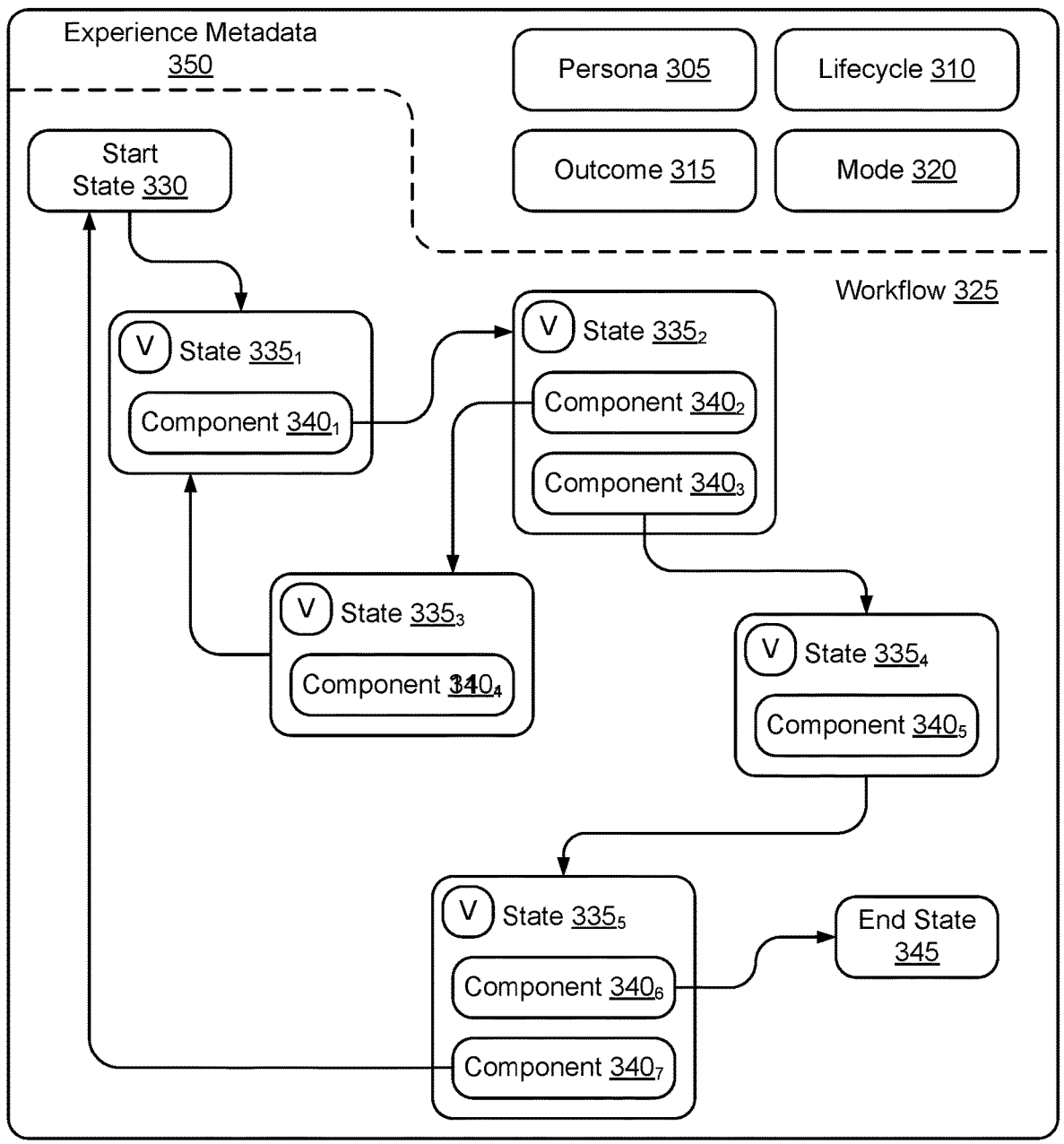
FIG. 3 is a functional block diagram of example experience design metadata, according to some embodiments.

FIG. 3 is a functional block diagram of example experience design metadata 350, according to some embodiments. As shown in FIG. 3, in some embodiments the user experience definition 175 metadata 350 includes the persona 305, lifecycle 310, outcome 315, and mode of consumption 320. In addition, the user experience definition 175 metadata 350 includes workflow metadata 325 specifying a series of states 330, transitions between states, components 340, and variability information (V).

In the example workflow 325 shown in FIG. 3, the workflow metadata 325 specifies a start state 330 and a subsequent transition to state $335_1$. In the context of a GUI, the start state might be encountered when the user starts the software application and state $335_1$ might be displaying an initial screen on the GUI that includes component $340_1$. The workflow metadata 325 specifies that, when the user interacts with component $340_1$, that the experience should transition to state $335_2$ containing components $340_2$ and $340_3$. The workflow metadata 325 further specifies state transitions that occur in connection with each of the components until an end state 345 is reached. In some embodiments, the end state 345 is associated with the outcome 315. Although FIG. 3 shows an example in which the workflow metadata 325 has one end state 345, it should be understood that there may be more than one end state 345, depending on the implementation. It should be understood that the example shown in FIG. 3 is merely one example of an experience design metadata, and it would be expected that different experience designs could vary considerably from the example shown in FIG. 3. Additionally, while FIG. 3 shows the example workflow in the form of a graph, the workflow may also be specified in a textual manner, for example in a plain text language file.

Figure 2:
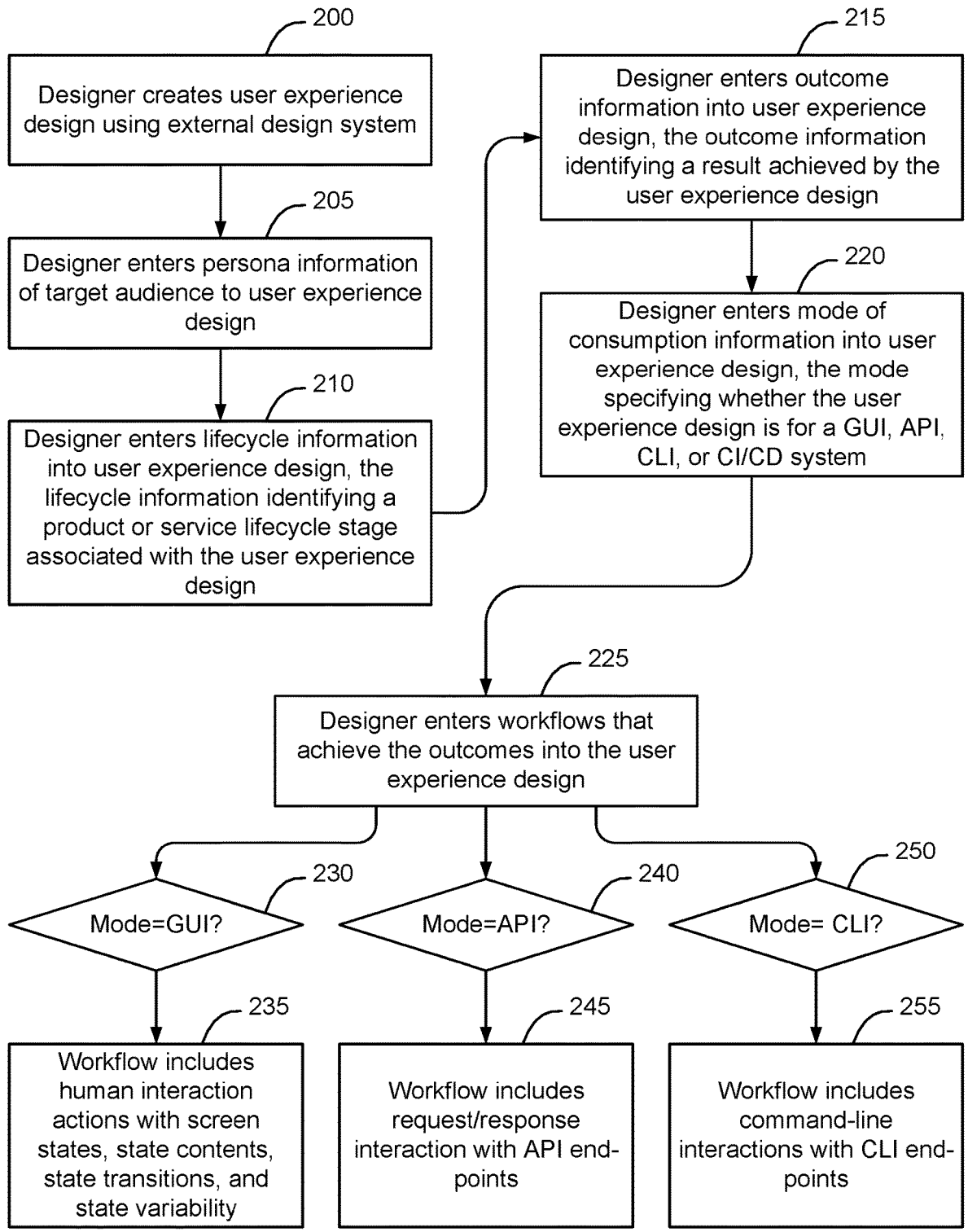
FIG. 2 is a flow chart of an example process of creating a user experience design that may be used by the example EDCMS of FIG. 1, according to some embodiments.

FIG. 2 is a flow chart of an example process of creating a user experience design 170 that may be used by the example EDCMS 195, according to some embodiments. Although the process of creating the user experience design 170 is implemented by design professionals using design systems 1001-100*n*, conventionally the design professionals would not be required to include experience metadata 350 when creating a user experience design 170. According to some embodiments, design professionals are prompted to include the experience metadata 350 when creating user experience designs 170, to enable the EDCMS 195 to create a comprehensive user experience specifications 180 from the user experience designs 170, which are then packaged and encoded, versioned and signed, and stored in a user experience design repository 145.

As shown in FIG. 2, a design professional creates a user experience design 170 using one of the external design system 1001-100*n* (block 200). While creating the user experience design 170, or in connection with entering the user experience design 170 into the EDCMS 195, the design professional enters persona information 305 of the target audience in the user experience design 170 (block 205). The design professional also enters lifecycle information 310 into the experience design 170 (block 210). The lifecycle information, in some embodiments, identifies a product or service lifecycle stage associated with the user experience design 170. In some embodiments, the design professional is prompted to enter the persona, lifecycle, and other similar metadata. In other embodiments, the design professional enters annotations made by the designer in the user experience design when interacting with the design system. For example, the designer might include standardized key=value formatted data, such as "mode=CLI" or "mode=GUI". As another example, the standardized key=value formatted data might include "persona=admin", "persona=storage admin", "outcome=InitialDeploy", "outcome=ConfigureTenant", etc. Multiple ways of collecting the user experience design metadata might be used depending on the implementation.

The design professional is also prompted to enter outcome information 315 into the user experience design 170 (block 215). The outcome information 315, in some embodiments, identifies a result achieved by the user experience design 170. The designer is also prompted to enter the mode information 320 into the user experience design 170 (block 220), which specifies whether the user experience design 170 is associated with a GUI, API, CLI, etc.

The design professional also uses the design system 100 to enter workflow metadata 325 that enables the user experience design 170 to achieve the outcome (block 225). If the mode 320=GUI (block 230), in some embodiments the workflow 325 includes the set of human interactions with screen states, state contents, state transitions, and state variability (block 235). If the mode 320=API (block 240), in some embodiments the workflow 325 includes request/response interaction with API endpoints (block 245). if the mode 320=CLI (block 250), in some embodiments the workflow 325 includes command-line interactions with CLI endpoints (block 255).

Once the user experience design 170 has been created, the EDCMS 195 accesses and obtains a copy of the user experience design 170 from the design system 100. As used herein, the term "user experience definition 175" is used to refer to a set of one or more files that are associated with the user experience design 170, and which are retrieved by the EDCMS 195 from the external design system 100 after the user experience design 170 has been created on the external design system 100. The particular format of the files which comprise the user experience definition 175 will depend on the syntax used by the external design system 100 to describe the user experience design 170. In some embodiments, when the user experience definition 175 is retrieved by the EDCMS 195, the EDCMS checks for the presence of the required experience metadata 350 and, if any user experience metadata 350 is missing, prompts are generated to request that the experience metadata 350 be added to the user experience definition.

Figure 4:
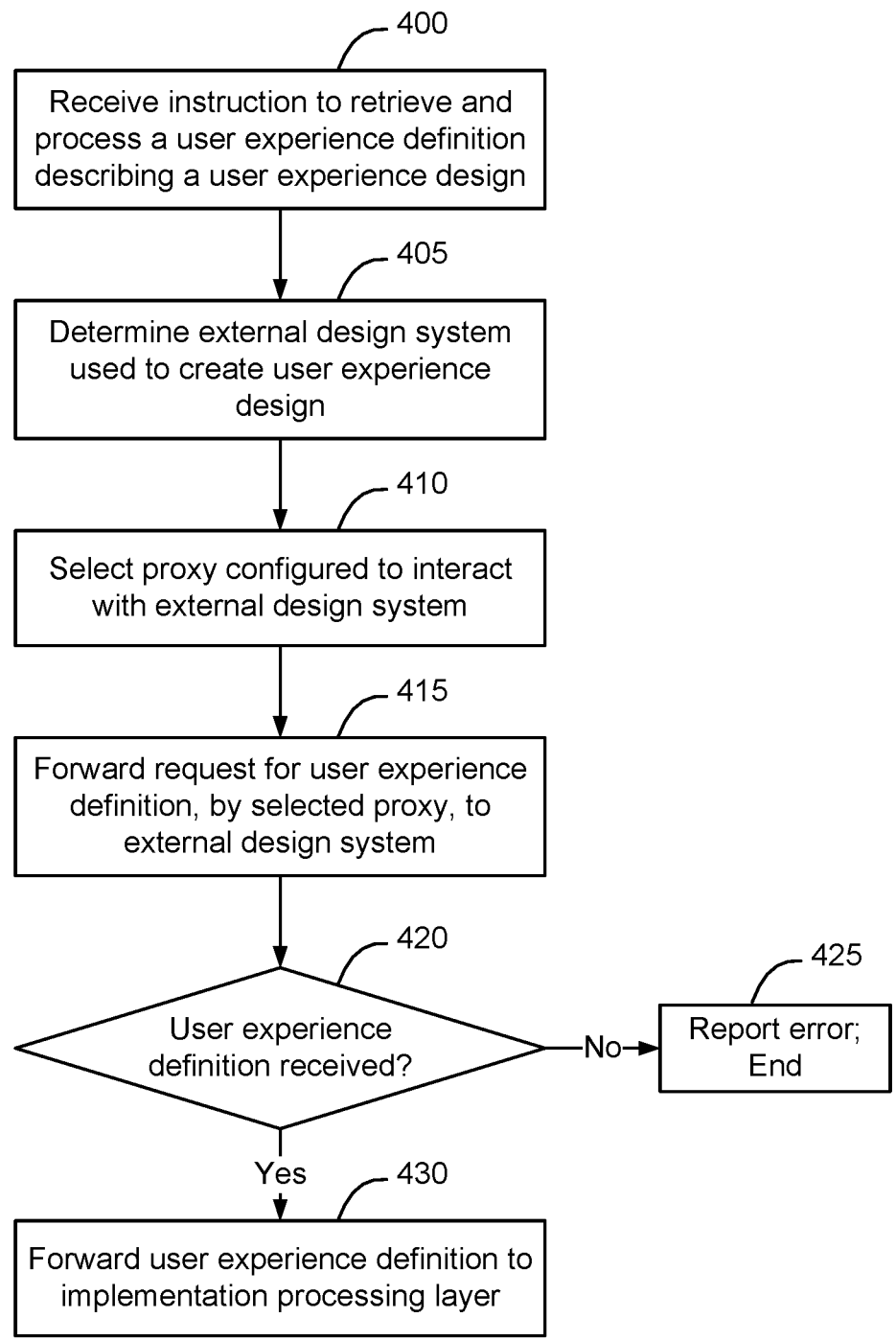
FIG. 4 is a flow chart of an example experience definition intake process implemented by the example EDCMS of FIG. 1, according to some embodiments.

FIG. 4 is a flow chart of an example user experience definition 175 intake process implemented by the example EDCMS 195, according to some embodiments. As shown in FIG. 4, in some embodiments the intake process starts when the EDCMS 195 receives an instruction to process a user experience design 170 (block 400). For example, the system 195 may have a user access system 155 such as an API or GUI that is configured to control execution of the EDCMS 195, for example to enter instructions into the EDCMS 195 to cause the EDCMS 195 to process user experience designs 170 or to retrieve and interact with versioned and signed codified user experiences 190 maintained in the user experience design repository 145. Accordingly, in some embodiments the EDCMS 195 receives an instruction to process a user experience design 170 (block 400) via user access 155.

The EDCMS 195 determines which external design system 100 was used to create the user experience designs 170 (block 405). In some embodiments, the external design system 100 is specified through user access 155.

In embodiments such where the EDCMS 195 includes multiple proxies 105, and each proxy 105 is configured to interact with one of the external design systems 100, the intake process selects the proxy 105 that is configured to interact with the external design system that was used to create the user experience design (block 410). It should be understood that, in some embodiments, a given proxy 105 might be configured to interact with multiple external design systems 100 or all commonly used external design systems 100. Accordingly, in embodiments where the EDCMS 195 only includes one proxy 105, the step shown in Block 410 might be omitted.

The intake process then forwards a request for the user experience definition 175 to the external design system 100, requesting that the external design system forward a copy of the one or more files associated with the user experience design 170 to the EDCMS 195 (block 420). The proxy then waits to receive the user experience definition 175. If the user experience definition 175 is not received, for example within a timeout period (a determination of NO at block 420) the EDCMS 195 reports an error (block 425) for example via the user access 155, and the intake process ends. If the user experience definition 175 is received (a determination of YES at block 420) the user experience definition 175 is forwarded to an implementation processing layer of the EDCMS 195 (block 430).

In some embodiments, the implementation layer processes the user experience definition 175 to create a comprehensive user experience specification 180. The implementation layer, in some embodiments, includes a persona and outcome mapping and normalization subsystem 110, a finite state machine (FSM) generation subsystem 115, a consistency checking and annotation subsystem 120, a component and style capture subsystem 125, and a specification capture subsystem 130. Each of these subsystems is described in greater detail below. Although FIG. 1 shows the user experience definition 175 being input to the persona and outcome mapping and normalization subsystem 110, it should be understood that the user experience definition 175 may be simultaneously input to each of the subsystem 110, 115, 120, 125, 130 at the same time. Likewise, although FIG. 1 shows arrows extending between the subsystem 110, 115, 120, 125, 130 from top to bottom, it should be understood that the subsystems may be used in any order, and that the subsystems may process the user experience definition 175 independently, depending on the implementation.

FIG. 5 is a flow chart of an example persona and outcome mapping and normalization process implemented by the persona and outcome mapping and normalization subsystem 110, according to some embodiments. In some embodiments, the outcome mapping and normalization subsystem 110 captures the target persona from persona metadata 305 and the target outcome from outcome metadata 315 and translates the persona 305 and outcome 315 into a standard taxonomy of personas and outcomes. For example, if the target persona specified in persona metadata 305 of the user experience definition 175 was "sys admin", and the standard taxonomy included "system administrator" as one of the standard personas, the outcome mapping and normalization subsystem 110 would change the experience metadata 350 such that the experience metadata 350 in the comprehensive user experience specification 180 referred to the intended persona using the term "system administrator". In some embodiments, the persona and outcome mapping and normalization subsystem 110 uses data and textual analytic techniques to implement the mapping and normalization of persona metadata 305 and outcome metadata 315.

As shown in FIG. 5, in some embodiments the persona and outcome mapping and normalization subsystem 110 extracts persona information from the persona metadata 305 of the user experience definition 175 (block 500). In some embodiments, if the persona metadata 305 or other experience metadata 350 was not included in the user experience definition 175 that was retrieved from the design system 100, the design professional may be prompted by the persona and outcome mapping and normalization subsystem 110 to enter the persona metadata 305 or other experience metadata 350 via the user access 155.

The persona and outcome mapping and normalization subsystem 110 then compares the extracted persona information with a taxonomy of known personas (block 505) to determine if the extracted persona is similar to any known personas (block 515). If the persona information extracted from the persona metadata 305 is similar to a known persona (a determination of YES at block 515) the persona information is normalized using the known persona in the persona taxonomy (block 520). In some embodiments, if the persona entered by the designer is normalized, a change notification is optionally provided to the designer indicating the change that was made to the persona via the user access 155. If the persona information extracted from the persona metadata 305 is not similar to a known persona (a determination of NO at block 515), the persona information may be added to the persona taxonomy (block 520). Optionally, addition of the persona to the persona taxonomy may require confirmation of the addition via the user access 155.

The persona and outcome mapping and normalization subsystem 110 extracts outcome information from the outcome metadata 315 of the user experience definition 175 (block 525) and compares the extracted outcome information with a taxonomy of known outcomes (block 530) to determine if the extracted outcome is similar to any known outcomes (block 535). If the outcome information extracted from the outcome metadata 315 is similar to a known outcome (a determination of YES at block 535) the outcome information is normalized using the known outcome in the outcome taxonomy (block 540). In some embodiments, if the outcome entered by the designer is normalized, a change notification is optionally provided to the designer indicating the change that was made to the outcome via the user access 155. If the outcome information extracted from the outcome metadata 315 is not similar to a known outcome (a determination of NO at block 535), the outcome information may be added to the outcome taxonomy (block 545). Optionally, addition of the outcome to the outcome taxonomy may require confirmation of the addition via the user access 155. The mapped and normalized persona and outcome are then added to the experience metadata 350 of the comprehensive user experience specification 180 (block 550).

Although FIG. 5 shows the persona and outcome mapping and normalization subsystem 110 first processing the persona metadata 305 and then processing the outcome metadata 315, it should be understood that the persona and outcome mapping and normalization subsystem 110 may process these forms of metadata 350 in either order or simultaneously, depending on the implementation.

In some embodiments, the EDCMS 195 includes a finite state machine generation subsystem 115 configured to create a finite state machine from the workflow metadata 325 of the user experience definition 175. In some embodiments, the finite state machine generation subsystem 115 uses the knowledge of the start state 330, incrementally captures state transition events and actions, incrementally captures the contents of each state, and incrementally captures the variable/invariable nature of each state. In some embodiments, the finite state machine generation subsystem 115 uses the workflow metadata 325 to build a Mealy machine, in which state transitions depend on the current state plus inputs, or a Moore machine, in which state transitions do not depend on the inputs, but only depend on the current state, and produces a formal, intermediate representation of a finite-state machine. In some embodiments, the finite state machine generation subsystem 115 also runs one or more sanity checks on the finite state machine, to ensure that the finite state machine meets a set of pre-requisite properties for experience designs. Example sanity checks might include a set of Boolean rules, such as "before a page loads, x event is required to happen."

Figure 6B:
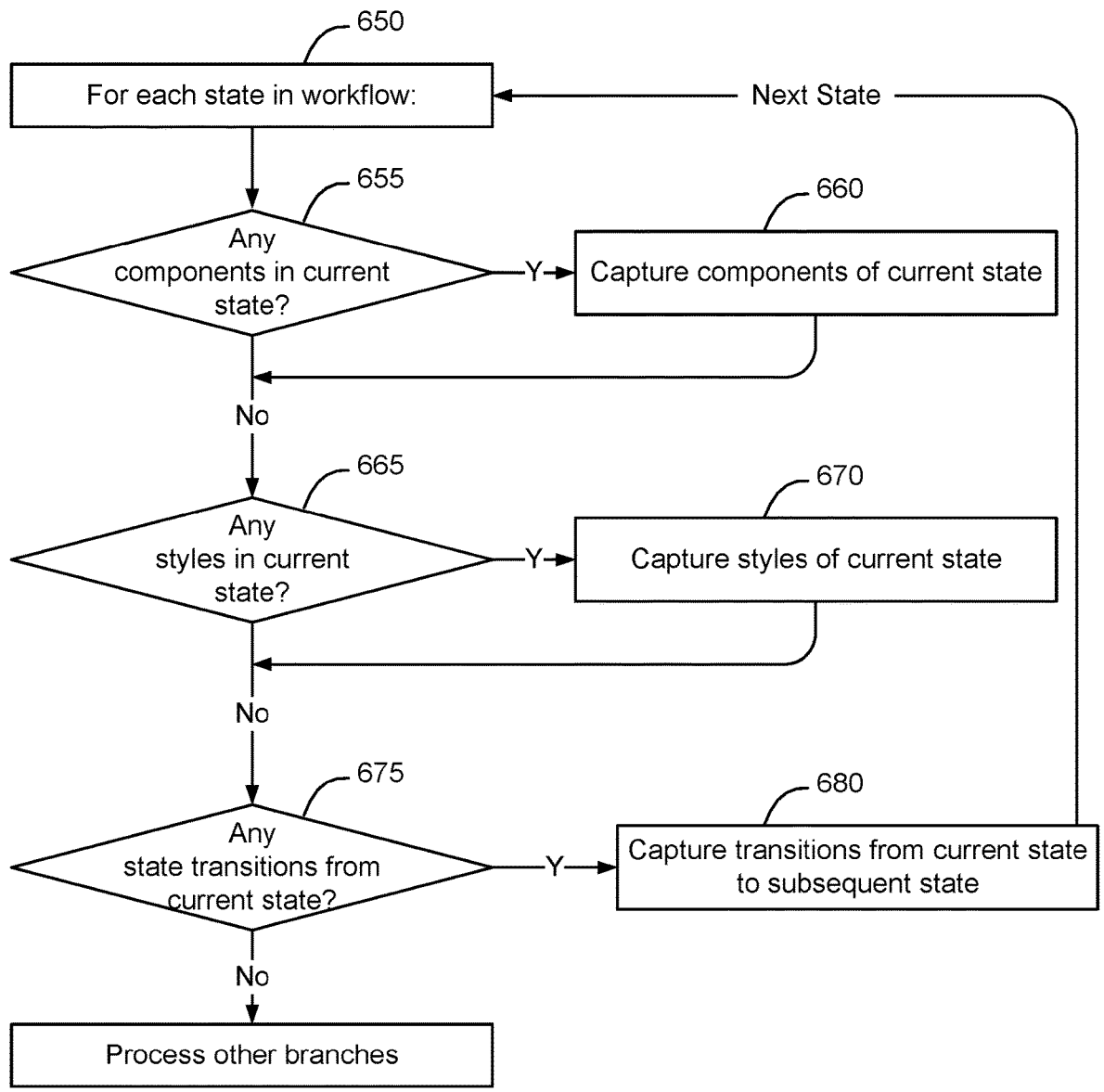

FIGS. 6A and 6B are a flow chart of an example finite state machine generation process implemented by the example EDCMS of FIG. 1, according to some embodiments. As shown in FIG. 6A, in some embodiments the finite state machine generation subsystem 115 extracts the workflow metadata 325 from the user experience definition 175 (block 600). Starting with the start state, the finite state machine generation subsystem 115 selects the workflow state (block 605) and builds a finite state machine from the extracted workflow state (block 610). The process of building each state of the finite state machine is shown in FIG. 6B, which is discussed below. The finite state machine generation subsystem 115 incrementally captures state transition events and actions (block 615) incrementally captures the content of each state (block 620), incrementally captures the variability or invariability of each state (block 625), and performs sanity checks on the finite state machine (block 630). Once the finite state machine has been built, the finite state machine is added to the comprehensive user experience specification 180 (block 635).

As shown in FIG. 6B, for each state 330, 335, 345, in the workflow 325 (block 650), the finite state machine generation subsystem 115 determines whether there are any components in the current state (block 655). If there are any components in the current state (a determination of YES at block 655) the finite state machine generation subsystem 115 captures the components of the current state (block 660). The finite state machine generation subsystem 115 also determines whether there are any styles in the current state (block 665). If there are any styles in the current state (a determination of YES at block 665) the finite state machine generation module 115 captures the styles of the current state (block 670). The finite state machine generation subsystem 115 also determines whether there are any state transitions from the current state (block 665). If there are any state transitions from the current state (a determination of YES at block 665) the finite state machine generation subsystem 115 captures the state transitions from the current state (block 670). These processes are iterated for each state in the workflow 325. Although FIG. 6B shows the finite state machine generation subsystem 115 operating on components, styles, and state transitions in sequential order, it should be understood that the finite state machine generation subsystem 115 may process these aspects of the workflow states in a different order or simultaneously, depending on the implementation.

In some embodiments, the EDCMS 195 includes a consistency checking and annotation subsystem 120. The consistency checking and annotation subsystem 120, in some embodiments, determines which elements of the user experience definition 175 are variable, and which are absolutely required, and annotates the comprehensive user experience specification 180 to indicate which elements are able to be varied by the engineers when implementing the comprehensive user experience specification 180. For example, in FIG. 3, each state has a variability V specified, which indicates whether and to what extent the particular state is variable or whether any of the components of the state are variable. An example variability measure may be to specify that the particular color that was selected is variable, such that the component or the state may be adjusted to automatically use one of a standard set of colors. Another example variability measure may be to allow for some latitude as to the particular placement of the component on the interface design. The consistency checking and annotation subsystem 120, in some embodiments, uses this variability information as well as heuristics, to annotate which aspects of the design are variable and by what percentage or other quantity the aspect may be varied in the final user experience.

In some embodiments, the consistency checking and annotation subsystem 120 also checks aspects of the user experience definition 175, such as components, with a set of known components. For example, if a "cancel transaction" component is always red, and the user experience definition 175 specifies that the "cancel transaction" component should be bright orange, the comprehensive user experience specification 180 may be annotated to indicate that the component is indicated as being bright orange, that the user experience definition 175 indicated that the color was variable, and that the normal color for this component is red. In that manner, when implementing the comprehensive user experience specification 180, an engineer can immediately determine both that the color is changeable and know that the normal color for the component is red.

Figure 7:
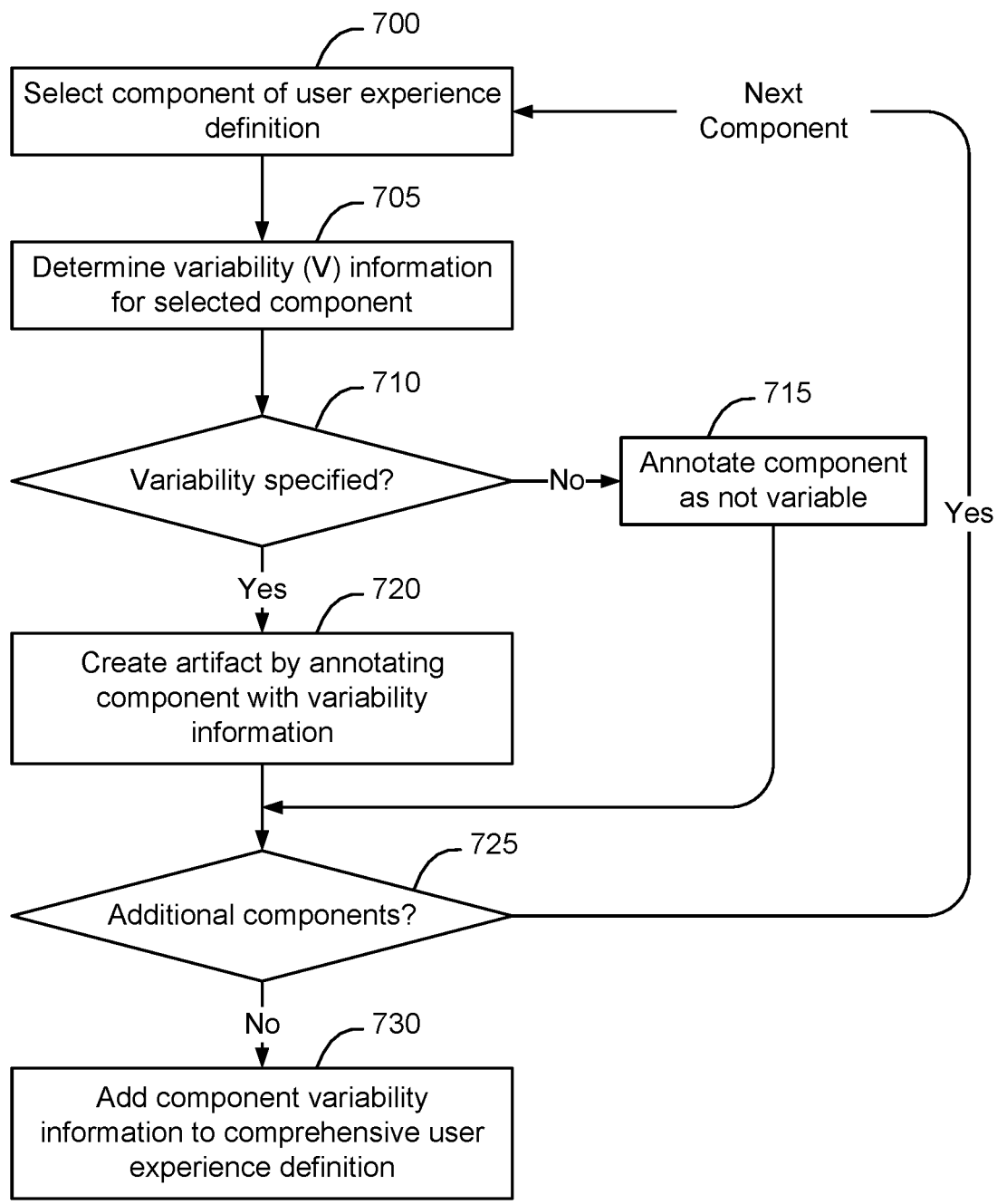
FIG. 7 is a flow chart of an example consistency checking and annotation process implemented by the example EDCMS of FIG. 1, according to some embodiments.

FIG. 7 is a flow chart of an example consistency checking and annotation process implemented by the example EDCMS of FIG. 1, according to some embodiments. As shown in FIG. 7, in some embodiments, the consistency checking and annotation subsystem 120 selects a first component of the user experience definition 175 (block 700). Variability information about the component is then obtained from the experience metadata 350 of the user experience definition 175.

A determination is then made as to whether the component is indicated to be variable (block 710). If the component is specified as being not variable (a determination of NO at block 710), the component is annotated in the comprehensive user experience specification 180 as be not variable (block 715). If the component is specified as being variable (a determination of YES at block 710), an artifact is created by annotating the component with the variability information in the comprehensive user experience specification 180 as being variable (block 720). The variability information may specify the type of variance that may be implemented, the percentage variability, or other ways that the particular component may be varied while staying within the design parameters of the original user experience definition 175.

The consistency checking and annotation subsystem 120 then determines if there are any additional components (block 725). If there are additional components (a determination of YES at block 725) another component is selected, and the process returns to block 700. The process continues until all components of the user experience definition 175 have been processed (a determination of NO at block 725). The component variability information determined by the consistency checking and annotation subsystem 120 is added to the comprehensive user experience specification 180, either at the end of the process as shown in FIG. 7 or incrementally as each component is processed, depending on the implementation.

In some embodiments, the consistency checking and annotation subsystem 120 uses the same process to also check the styles of each of the states, to determine whether the styles used in each of the states are variable. Style consistency and annotation can be implemented for each state using the same process shown in FIG. 7, and can be implemented at the same time as the components are processed by the consistency checking and annotation subsystem 120 or can be processed separately from the components.

In some embodiments, the EDCMS 195 includes a component and style capture subsystem 125 configured to capture, by value or by reference, all component instance definitions and related artifacts of the finite state machine. The component and style capture subsystem 125, in some embodiments, conducts either a depth-first or breadth-first walk of the finite state machine graph, marking visited states along the way, to identify all components of the finite state machine. The component and style capture subsystem 125 compares the components used in the finite state machine with a store of known components in database 150 and, if a new component is detected that is not contained in the store of known components, adds the new component to the store of known components. In this manner, a store of known components can be incrementally built over time by the EDCMS 195. In some embodiments, the data store of known components is used by the consistency checking and annotation subsystem 120 (described above) when checking components of a user experience definition 175 for consistency with previous versions of the same components. Components in the data store of known components may be indexed, within the namespace of the experience at hand, as well as by its version, signature, and other unique fields, depending on the implementation. In some embodiments, if a component or style in the experience definition matches a known component or style in the data store of known components or styles, the correspondence is noted in the comprehensive user experience specification.

Figure 8:
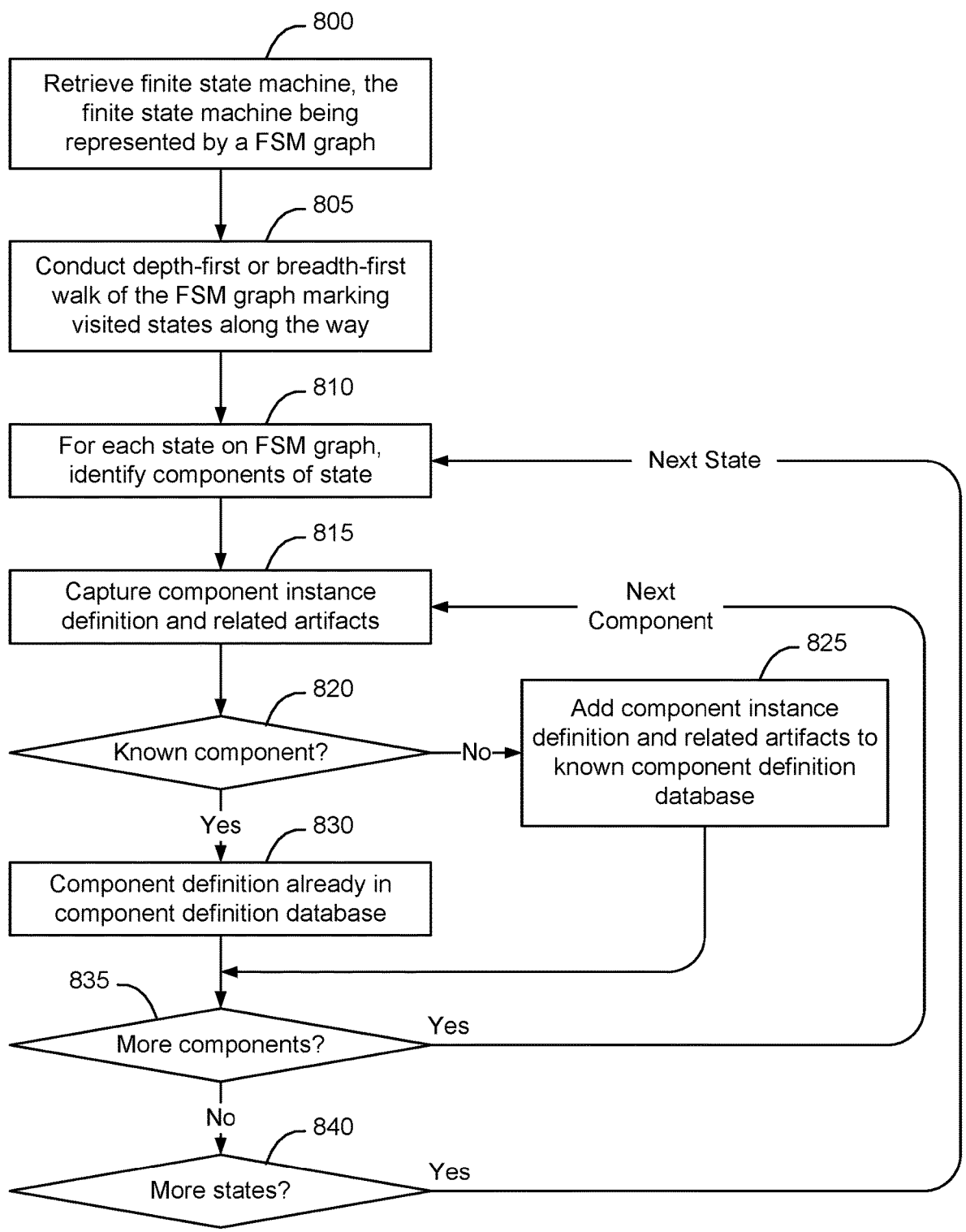
FIG. 8 is a flow chart of an example component capture process implemented by the example EDCMS of FIG. 1, according to some embodiments.

FIG. 8 is a flow chart of an example component capture process implemented by the example EDCMS of FIG. 1, according to some embodiments. Although FIG. 8 describes some embodiments of the component and style capture subsystem 125 implementing a depth-first walk of the finite state machine, it should be understood that the component and style capture subsystem 125 could similarly implement a breadth-first walk of the finite state machine. Any process of visiting each state of the finite state machine may be used to capture all components used by the finite state machine, depending on the implementation. Similarly, although FIG. 8 shows the component and style capture subsystem 125 implementing a walk through the completed finite state machine, it should be understood that the states of the finite state machine may be individually forwarded to the component and style capture subsystem 125 for processing as they are added to the finite state machine by the finite state machine generation subsystem 115, depending on the implementation.

As shown in FIG. 8, in some embodiments the component and style capture subsystem 125 retrieves the finite state machine, represented by a finite state machine graph, that has been added to the comprehensive user experience specification 180 (block 800). The component and style capture subsystem 125 then conducts a depth-first walk of the finite state machine graph marking visited states along the way (block 805).

For each state on the finite state machine graph, the component and style capture subsystem 125 determines if the state has any components (block 810). If the state has any components, the component and style capture subsystem 125 captures a first of the components by capturing the component instance definition and related artifacts (block 815). A determination is then made as to whether the captured component is a known component (block 820). If the captured component is not known (a determination of NO at block 820), the component and style capture subsystem 125 adds the component definition and related artifacts to the data store of known components maintained by database 150. Artifacts, in this context, may include variability information associated with the component added to the component by the consistency checking and annotation subsystem 120.

If the component is known (a determination of YES at block 820) the component definition is already in the data store of known components that is maintained in database 150 (block 830) and the component definition does not need to be added to the data store of known components. In some embodiments, an entry may be added to the component entry in the data store of known components to indicate that the component has been used in the comprehensive user experience specification 180.

The component and style capture subsystem 125 continues processing the current state by determining if the current state has any additional components (block 835). If there are additional components (a determination of YES at block 835), the component and style capture subsystem 125 selects a subsequent component and the process returns to block 815. The process iterates until there are no additional components of the current state (a determination of NO at block 835).

A determination is then made as to whether there are additional states of the finite state machine to be processed (block 840). If there are additional states to be processed (a determination of YES at block 840) a subsequent state is selected, and the process returns to block 810. The process ends when there are no additional states to process (a determination of NO at block 840). Optionally, the comprehensive user experience specification 180 may be annotated to indicate which components are used by which state. This may be useful, for example, in instances where components have previously been coded by engineers, to enable the engineers to select previously implemented code for the particular components when implementing the comprehensive user experience specification 180.

In some embodiments, in addition to comparing components referenced by states of the finite state machine to know components, the component and style capture subsystem 125 also uses the same process shown in FIG. 8 to review each state visited for style definitions, and compares the style definitions with a data store of known style definitions. Thus, although FIG. 8 shows the process used by the component and style capture subsystem 125 to capture components, it should be understood that the process used in FIG. 8 is also used to capture style definitions of the states of the finite state machine.

In some embodiments, the EDCMS 195 includes a specification capture engine 130. In some embodiments, this subsystem is configured to convert all parts of the comprehensive user experience specification 180, from the persona and mapping normalization subsystem, the finite state generation subsystem 115, the consistency checking and annotation subsystem 120, and from the component and style capture subsystem 125, into a standard versioned stylized, codified specification. The specification, in some embodiments, is expressed in a human-readable and machine-readable languages such as JSON, XML, or YAML.

Figure 9:
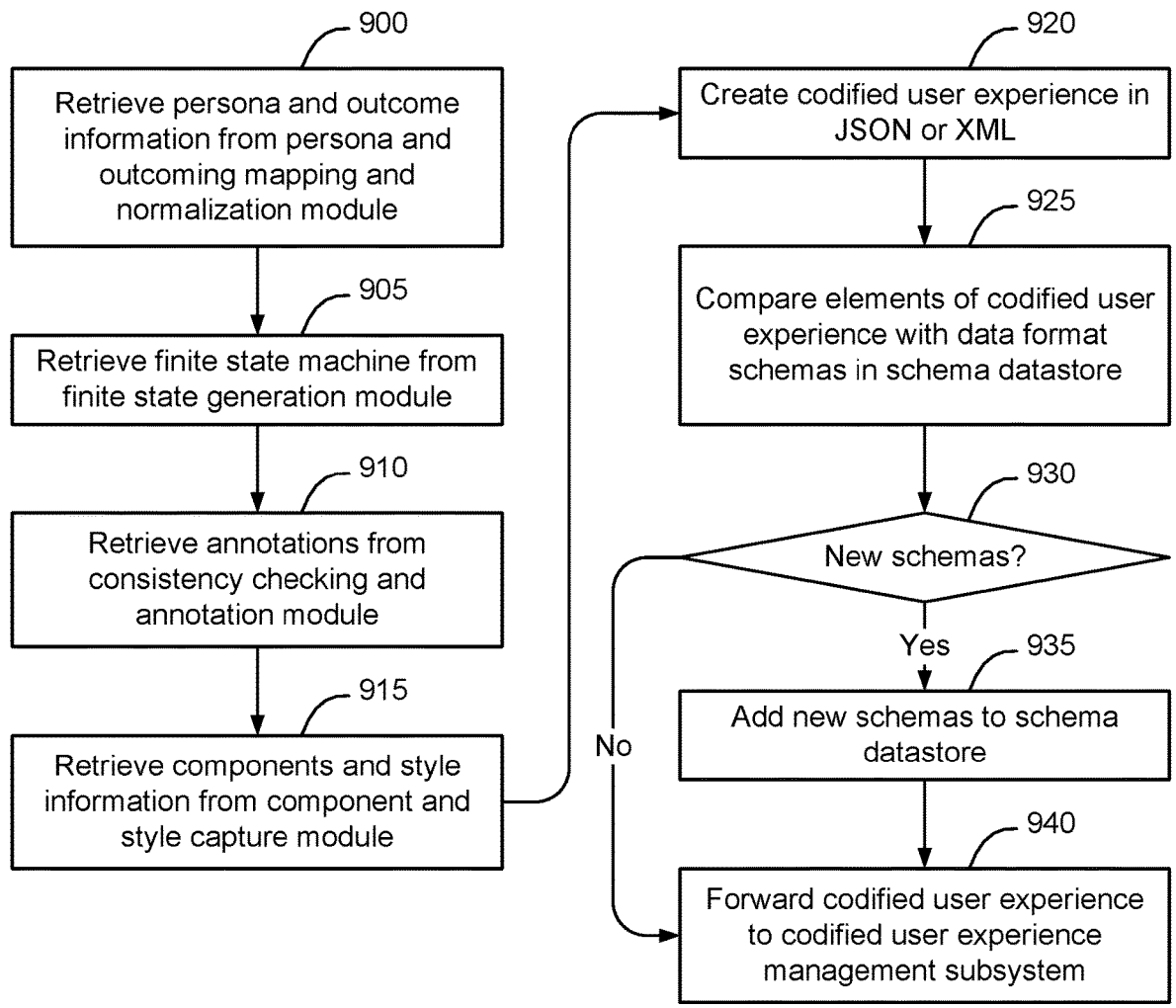
FIG. 9 is a flow chart of an example specification capture process implemented by the example EDCMS of FIG. 1, according to some embodiments.

FIG. 9 is a flow chart of an example specification capture process implemented by the example EDCMS of FIG. 1, according to some embodiments. As shown in FIG. 9, in some embodiments the specification capture subsystem 130 retrieves persona and outcome information created by the persona and outcome mapping and normalization subsystem (block 900); retrieves the finite state machine created by the finite state machine generation subsystem 115 (block 905); retrieves annotations from the consistency checking and annotation subsystem 120 (block 910); and retrieves components and style information from the component and style capture subsystem 125 (block 915).

The specification capture engine 130 creates the comprehensive user experience specification 180 (block 920) in JSON, XML, YAML, or another machine readable and human readable language. The finite state machine defines states and transitions between states, which are able to be converted to JSON, XML, or YAML to be output in code form as a comprehensive user experience specification 180 for use by engineers to implement the user experience design 170. Annotations may be added to the JSON, XML, or YAML code as comments, to thereby enable all aspects of the user experience definition 175 to be specified in the JSON, XML, or YAML that is used to implement the comprehensive user experience specification 180.

In some embodiments, the JSON, XML, or YAML elements of the comprehensive user experience specification 180 are compared with data format schemas in database 150 (block 925) to ensure that the elements meet the data format schemas needed to implement the user experience definition 175 and to capture new schemas as they are created. Accordingly, in some embodiments a determination is made as to whether a schema of the comprehensive user experience specification 180 is a new schema (block 930). If the schema is new schema (a determination of YES at block 930) the schema is added to the schema datastore. If the schema is not a new schema (a determination of NO at block 930) the schema is not required to be added to the schema datastore. In either instance, once the comprehensive user experience specification 180 has been created in JSON, XML, or YAML, it is forwarded to a management system of the EDCMS 195.

In some embodiments, the management system has a package generation and encoding subsystem 135 configured to receive the comprehensive user experience specification 180 and create a codified user experience design 185. In some embodiment, the package generation and encoding subsystem 135 encodes the comprehensive user experience specification 180 as well as artifacts received from each of the implementation subsystems. In some embodiments, the package generation and encoding subsystem 135 operates in a request/response manner with each of the subsystems 110, 115, 120, 125, 130, to capture partial results and store the partial results in database 150. The package generation and encoding subsystem 135 also packages the comprehensive user experience specification 180 to enable all aspects of the comprehensive user experience specification 180 to be included in the codified user experience design 185.

FIGS. 10A-10E are flow charts of example package generation and encoding processes implemented by the example EDCMS of FIG. 1, according to some embodiments.

Figure 10A:
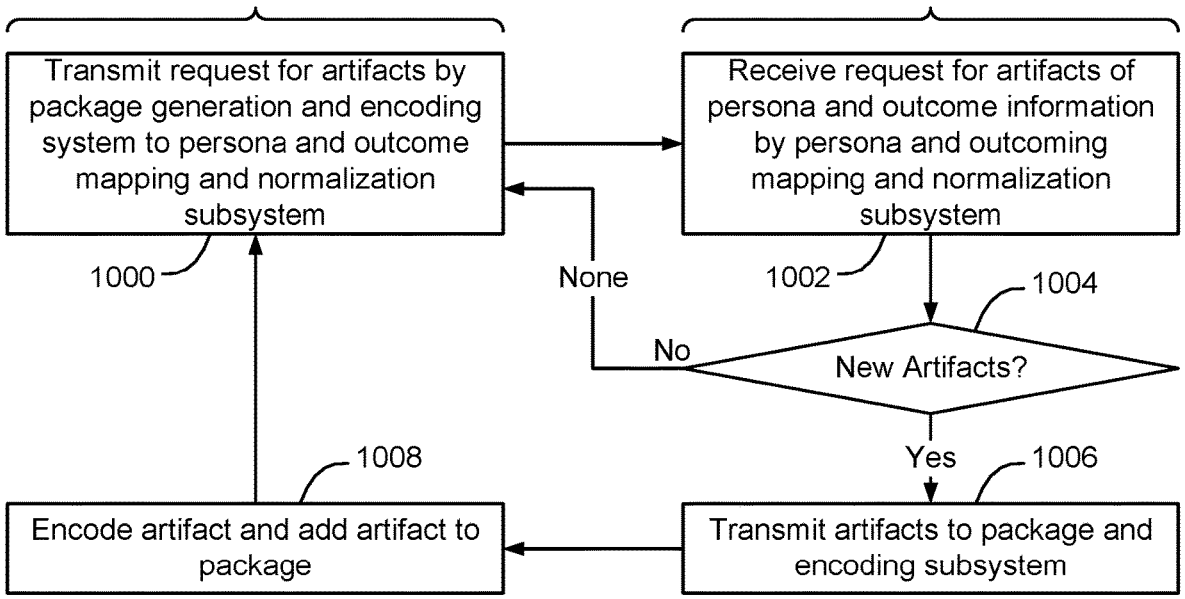
FIGS. 10A-10E are flow charts of example package generation and encoding processes implemented by the example EDCMS of FIG. 1, according to some embodiments.

As shown in FIG. 10A, in some embodiments the package generation and encoding subsystem 135 transmits a request for artifacts to the persona and outcome mapping and normalization subsystem 110 (block 1000). When the persona and outcome mapping and normalization subsystem 110 receives the artifact request (block 1002) the persona and outcome mapping and normalization subsystem 110 determines whether there are any new artifacts (block 1004).

If there are no new artifacts (a determination of NO at block 1004), the persona and outcome mapping and normalization subsystem 110 messages that there are no new artifacts. If there are new artifacts (a determination of YES at block 1004), the persona and outcome mapping and normalization subsystem 110 transmits the artifacts to the package generation and encoding subsystem 135 (block 1006). When the package generation and encoding subsystem 135 receives the artifact, the package generation and encoding subsystem 135 packages and encodes the artifact and adds the artifact to the codified user experience design 185 (block 1008). The process then iterates until the codified user experience design 185 has been fully built and packaged.

Figure 10B:
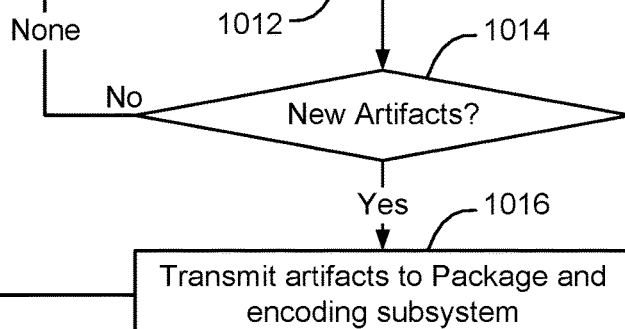
Figure 10C:
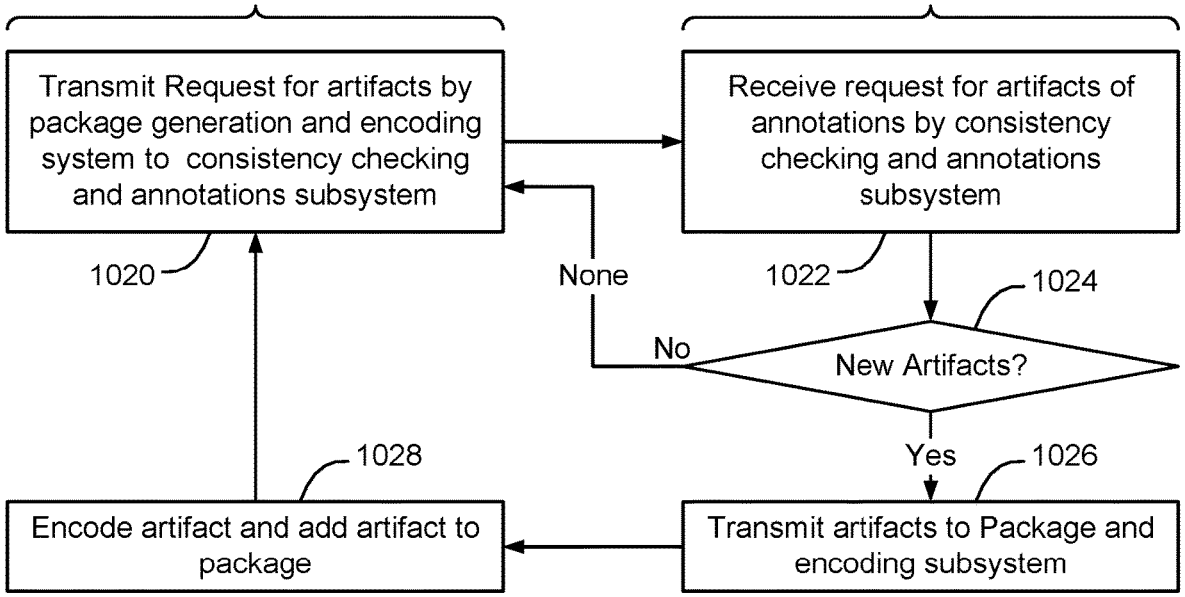
Figure 10D:
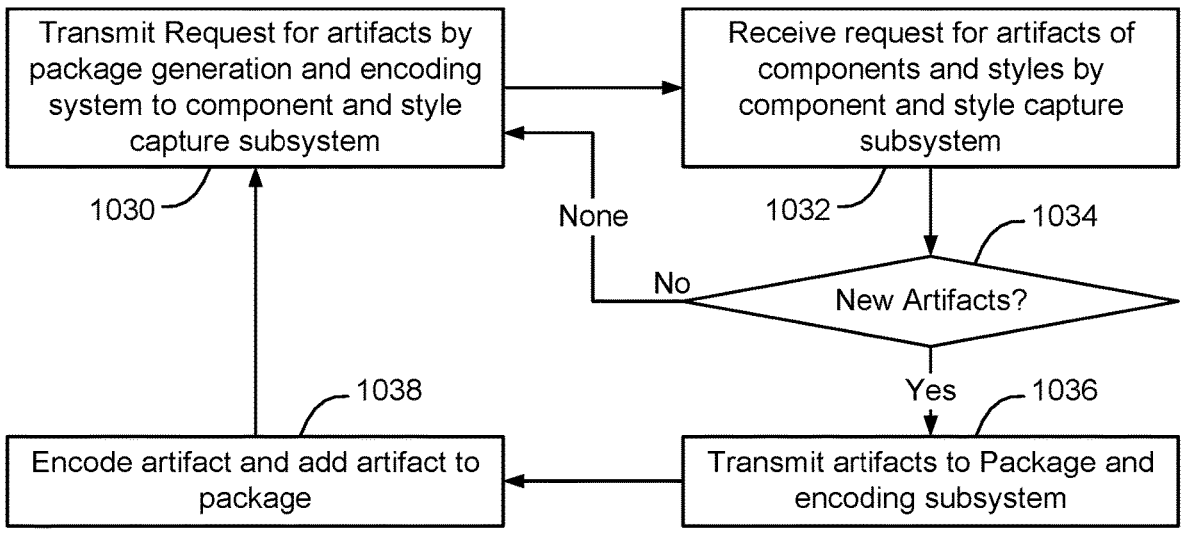
Figure 10E:
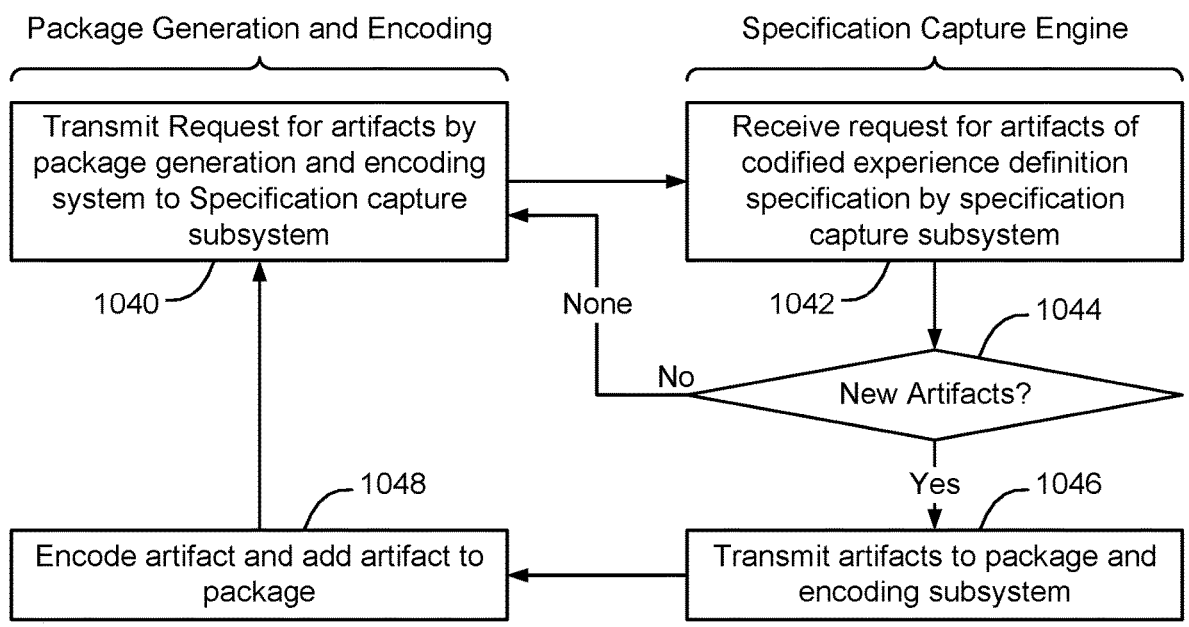

The package generation and encoding subsystem 135 uses a similar process to interact with the FSM generation subsystem 115 (see FIG. 10B), the consistency checking and annotation subsystem 120 (see FIG. 10C), the component and style capture subsystem (See FIG. 10D) and the specification capture subsystem (See FIG. 10E).

As shown in FIG. 10B, in some embodiments the package generation and encoding subsystem 135 transmits a request for artifacts to the FSM generation subsystem 115 (block 1010). When the FSM generation subsystem 115 receives the artifact request (block 1012) the FSM generation subsystem 115 determines whether there are any new artifacts (block 1014). If there are no new artifacts (a determination of NO at block 1014), the FSM generation subsystem 115 messages that there are no new artifacts. If there are new artifacts (a determination of YES at block 1014), the FSM generation subsystem 115 transmits the artifacts to the package generation and encoding subsystem 135 (block 1016). When the package generation and encoding subsystem 135 receives the artifact, the package generation and encoding subsystem 135 packages and encodes the artifact and adds the artifact to the codified user experience design 185 (block 1018). The process then iterates until the codified user experience design 185 has been fully built and packaged.

As shown in FIG. 10C, in some embodiments the package generation and encoding subsystem 135 transmits a request for artifacts to the consistency checking and annotation subsystem 120 (block 1020). When the consistency checking and annotation subsystem 120 receives the artifact request (block 1022) the consistency checking and annotation subsystem 120 determines whether there are any new artifacts (block 1024). If there are no new artifacts (a determination of NO at block 1024), the consistency checking and annotation subsystem 120 messages that there are no new artifacts. If there are new artifacts (a determination of YES at block 1024), the consistency checking and annotation subsystem 120 transmits the artifacts to the package generation and encoding subsystem 135 (block 1026). When the package generation and encoding subsystem 135 receives the artifact, the package generation and encoding subsystem 135 packages and encodes the artifact and adds the artifact to the codified user experience design 185 (block 1028). The process then iterates until the codified user experience design 185 has been fully built and packaged.

As shown in FIG. 10D, in some embodiments the package generation and encoding subsystem 135 transmits a request for artifacts to the component and style capture subsystem 125 (block 1030). When the component and style capture subsystem 125 receives the artifact request (block 1032) the component and style capture subsystem 125 determines whether there are any new artifacts (block 1034). If there are no new artifacts (a determination of NO at block 1034), the component and style capture subsystem 125 messages that there are no new artifacts. If there are new artifacts (a determination of YES at block 1034), the component and style capture subsystem 125 transmits the artifacts to the package generation and encoding subsystem 135 (block 1036). When the package generation and encoding subsystem 135 receives the artifact, the package generation and encoding subsystem 135 packages and encodes the artifact and adds the artifact to the codified user experience design 185 (block 1038). The process then iterates until the codified user experience design 185 has been fully built and packaged.

As shown in FIG. 10E, in some embodiments the package generation and encoding subsystem 135 transmits a request for artifacts to the specification capture subsystem 130 (block 1040). When the specification capture subsystem 130 receives the artifact request (block 1042) the specification capture subsystem 130 determines whether there are any new artifacts (block 1044). If there are no new artifacts (a determination of NO at block 1044), the specification capture subsystem 130 messages that there are no new artifacts. If there are new artifacts (a determination of YES at block 1044), the specification capture subsystem 130 transmits the artifacts to the package generation and encoding subsystem 135 (block 1046). When the package generation and encoding subsystem 135 receives the artifact, the package generation and encoding subsystem 135 packages and encodes the artifact and adds the artifact to the codified user experience design 185 (block 1048). The process then iterates until the codified user experience design 185 has been fully built and packaged.

Figure 11:
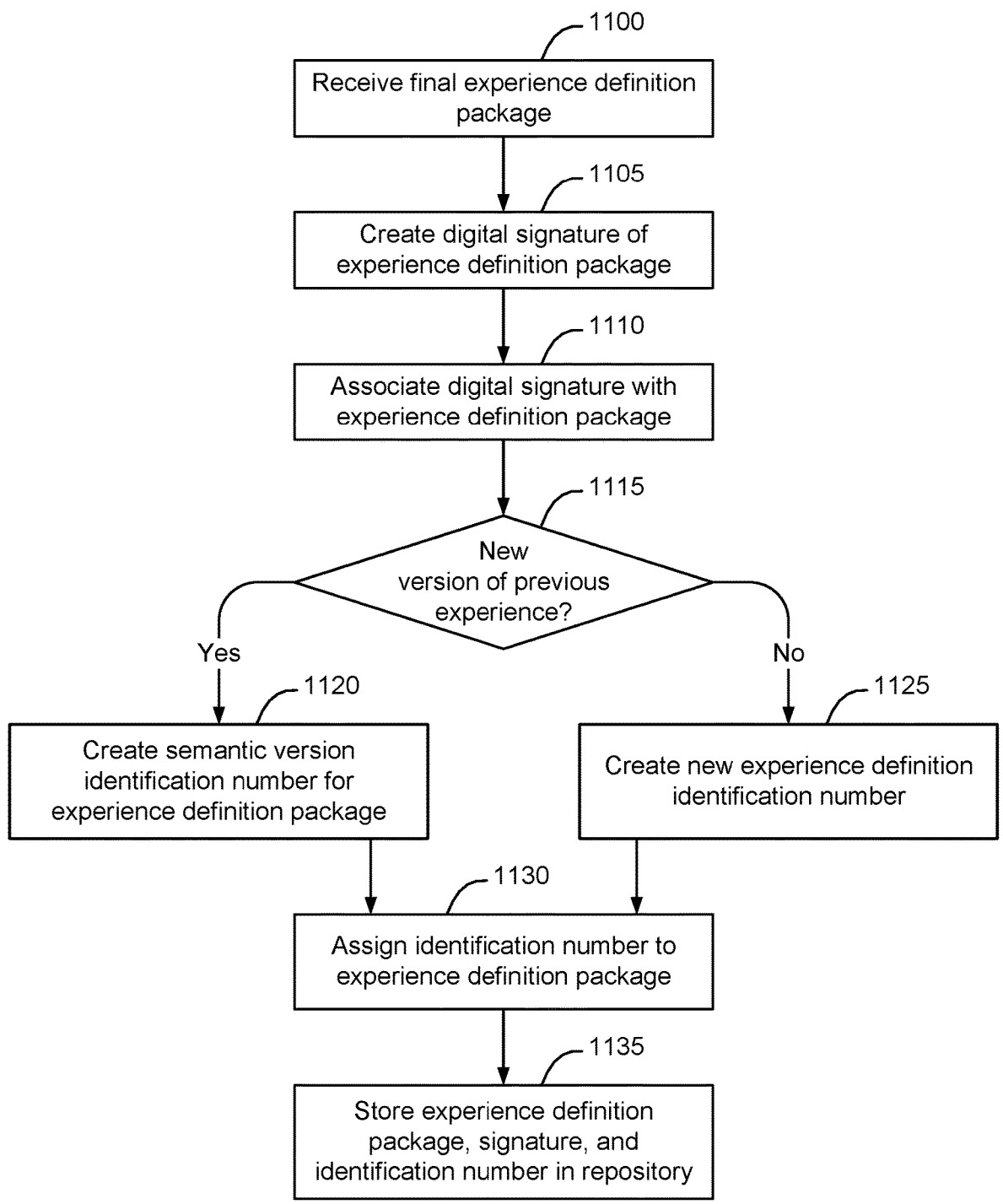
FIG. 11 is a flow chart of an example signature marking and versioning process implemented by the example EDCMS of FIG. 1, according to some embodiments.

FIG. 11 is a flow chart of an example signature marking and versioning process implemented by the example EDCMS of FIG. 1, according to some embodiments. As shown in FIG. 11, in some embodiments a signature marking and versioning subsystem 140 receives the comprehensive user experience specification 180 and signs and versions the comprehensive user experience to create a versioned and signed codified experience specification. In some embodiments, the signature is implemented using a hash to create a digital signature that is virtually guaranteed to be universally unique. An example hash might be implemented, for example, using a Secure Hash Algorithm such as SHA-256, which creates a 32-byte hash signature. Other hash algorithms may similarly be used, depending on the implementation. In some embodiments the versioning process assigns a version number to the versioned and signed codified experience specification 190 to enable each version of a given user experience design to be specifically identified. Example version number might be 1.1, 1.2, 1.2.1, etc., depending on the implementation. In some embodiments, the user is prompted to provide input as to how the user experience design should be versioned. The package, its signature, and its version identifier, constitute a unique artifact for a particular experience design. Any future change to the design will result in a new signature and a new version number, to enable all versions of the user experience design to be uniquely identified within the user experience design repository 145.

Figure 12:
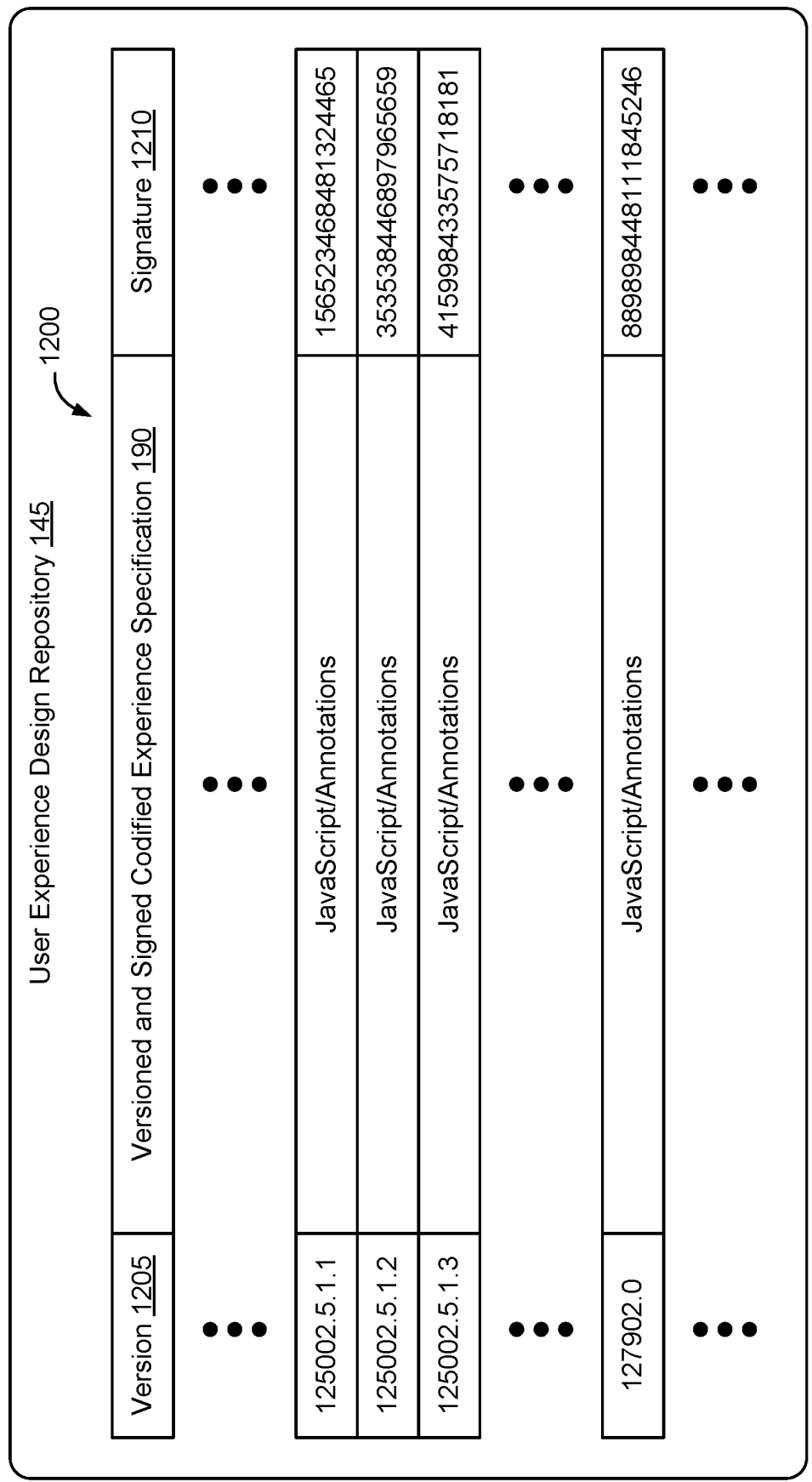
FIG. 12 is a functional block diagram of an example data structure configured to implement a codified user experience design repository of the EDCMS of FIG. 1, according to some embodiments.

FIG. 12 is a functional block diagram of an example data structure configured to implement a user experience design repository 145 of the EDCMS of FIG. 1, according to some embodiments. As shown in FIG. 12, in some embodiments the user experience design repository 145 includes a data structure 1200 having entries containing versioned and signed codified experience specifications 190. Each entry has a version number 1205 that uniquely identifies the experience specification 190 and a signature 1210 that is able to be used to verify the content of the experience specification 190. The user experience design repository 145 can be used as a single source for all codified versioned instances of all experience designs, and can be used in a CI/CD pipeline manner, kicking off events and operations when new packages are added or existing packages are changed.

As described above, in some embodiments the EDCMS is configured to interface with design systems to retrieve a user experience definition based on a user experience design, and generate a full, versioned pattern implementation in a web framework such as Angular, React, Vue, or micro frontend. This enables a complete CSS, HTML, and JavaScript to be created for an entire prototype, that is then usable by the engineers to create a user interface based on the user experience design.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, subsystems, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

The invention claimed is:

1. A method of codifying user experience designs and managing the codified user experience designs, comprising:
retrieving a user experience definition from a design system, the user experience definition being based on a user experience design created in the design system and including user experience metadata, the user experience metadata including persona metadata, outcome metadata, and workflow metadata;
extracting persona and outcome metadata from the user experience metadata and normalizing the extracted persona and outcome metadata against a taxonomy of persona and outcome metadata;
generating a finite state machine from the workflow metadata;
using the normalized extracted persona and outcome metadata and the finite state machine to generate a codified user experience design;
versioning the codified user experience design to create a versioned codified experience specification; and
storing the versioned codified user experience specification in a user experience design repository.

2. The method of claim 1, further comprising signing the versioned codified user experience specification to create a signature of the versioned codified user experience specification, and storing the signature with the versioned codified user experience specification in the user experience design repository.

3. The method of claim 1, wherein the persona metadata identifies a classification of users for whom the user experience is intended.

4. The method of claim 1, wherein the outcome metadata identifies a software function accessed using the user experience.

5. The method of claim 1, wherein the user experience metadata further comprises mode of consumption metadata, specifying a type of user experience associated with the user experience definition.

6. The method of claim 5, wherein the type of user experience is a Graphical User Interface (GUI), Command Line Interface (CLI), Application Programming Interface (API), or Continuous Integration/Continuous Delivery (CI/CD) system.

7. The method of claim 1, wherein the finite state machine is a Mealy machine, in which state transitions depend on the current state plus inputs, or a Moore machine, in which state transitions do not depend on the inputs, but only depend on the current state.

8. The method of claim 1, wherein the finite state machine has a start state, a plurality of intermediate states, and one or more end states, and wherein at least some of the intermediate states include design components.

9. The method of claim 8, further comprising visiting each intermediate state of the finite state machine, capturing each component of each state, and storing the captured components in a known component database.

10. The method of claim 8, wherein at least some of the intermediate states include design styles; the method further comprising visiting each intermediate state of the finite state machine and capturing each style of each state, and storing the captured styles in a known style database.

11. The method of claim 1, wherein the step of using the normalized extracted persona and outcome metadata and the finite state machine to generate a codified user experience design comprises automatically generating JavaScript Object Notation (JSON), eXtensible Markup Language (XML), or YAML code from the finite state machine, and including the JSON, XML, or YAML code in the codified user experience design.

12. A non-transitory tangible computer readable storage medium having stored thereon a computer program for codifying user experience designs and managing the codified user experience designs, the computer program including a set of instructions which, when executed by a computer, cause the computer to perform a method comprising the steps of:

retrieving a user experience definition from a design system, the user experience definition being based on a user experience design created in the design system and including user experience metadata, the user experience metadata including persona metadata, outcome metadata, and workflow metadata;

extracting persona and outcome metadata from the user experience metadata and normalizing the extracted persona and outcome metadata against a taxonomy of persona and outcome metadata;

generating a finite state machine from the workflow metadata;

using the normalized extracted persona and outcome metadata and the finite state machine to generate a codified user experience design;

versioning the codified user experience design to create a versioned codified experience specification; and storing the versioned codified user experience specification in a user experience design repository.

13. The non-transitory tangible computer readable storage medium of claim 12, further comprising signing the versioned codified user experience specification to create a signature of the versioned codified user experience specification, and storing the signature with the versioned codified user experience specification in the user experience design repository.

14. The non-transitory tangible computer readable storage medium of claim 12:
wherein the persona metadata identifies a classification of users for whom the user experience is intended;
wherein the outcome metadata identifies a software function accessed using the user experience; and
wherein the user experience metadata further comprises mode of consumption metadata, specifying a type of user experience associated with the user experience definition.

15. The non-transitory tangible computer readable storage medium of claim 14, wherein the type of user experience is a Graphical User Interface (GUI), Command Line Interface (CLI), Application Programming Interface (API), or Continuous Integration/Continuous Delivery (CI/CD) system.

16. The non-transitory tangible computer readable storage medium of claim 12, wherein the finite state machine is a Mealy machine, in which state transitions depend on the current state plus inputs, or a Moore machine, in which state transitions do not depend on the inputs but only depend on the current state.

17. The non-transitory tangible computer readable storage medium of claim 12, wherein the finite state machine has a start state, a plurality of intermediate states, and one or more end states, and wherein at least some of the intermediate states include design components.

18. The non-transitory tangible computer readable storage medium of claim 17, further comprising visiting each intermediate state of the finite state machine, capturing each component of each state, and storing the captured components in a known component database.

19. The non-transitory tangible computer readable storage medium of claim 17, wherein at least some of the intermediate states include design styles; the method further comprising visiting each intermediate state of the finite state machine and capturing each style of each state, and storing the captured styles in a known style database.

20. The non-transitory tangible computer readable storage medium of claim 12, wherein the step of using the normalized extracted persona and outcome metadata and the finite state machine to generate a codified user experience design comprises automatically generating JavaScript Object Notation (JSON), eXtensible Markup Language (XML), or YAML code from the finite state machine, and including the JSON, XML, or YAML code in the codified user experience design.

* * * * *